United States Patent [19]

Wangler et al.

[11] Patent Number: 5,278,423
[45] Date of Patent: Jan. 11, 1994

[54] OBJECT SENSOR AND METHOD FOR USE IN CONTROLLING AN AGRICULTURAL SPRAYER

[75] Inventors: Richard J. Wangler, Maitland; Keith L. Fowler, Orlando; Robert E. McConnell, II, Longwood, all of Fla.

[73] Assignee: Schwartz Electro-Optics, Inc., Orlando, Fla.

[21] Appl. No.: 997,737

[22] Filed: Dec. 30, 1992

[51] Int. Cl.$^5$ ............................................. G01N 21/86
[52] U.S. Cl. ..................................... 250/561; 47/1.7; 356/4
[58] Field of Search ................. 250/222.1, 561; 356/1, 356/4, 141, 152; 239/77; 47/1.7

[56] References Cited

U.S. PATENT DOCUMENTS

| | | | |
|---|---|---|---|
| 3,489,351 | 1/1970 | Patterson | 239/78 |
| 4,015,366 | 4/1977 | Hall, III | 56/237 |
| 4,179,216 | 12/1979 | Theurer et al. | 356/4 |
| 4,490,038 | 12/1984 | Theurer et al. | 356/1 |
| 4,768,713 | 9/1988 | Roper | 239/77 |
| 4,823,268 | 4/1989 | Giles et al. | 239/77 |
| 5,172,861 | 12/1992 | Lenhardt | 239/77 |
| 5,222,324 | 3/1993 | O'Neall et al. | 47/1.7 |

Primary Examiner—David C. Nelms
Assistant Examiner—K. Shami
Attorney, Agent, or Firm—Allen, Dyer, Doppelt, Franjola & Milbrath

[57] ABSTRACT

An object sensor and method using pulsed laser range imaging technology is adapted for controlling an agricultural spraying system. A single laser sensor employs a continuously scanned pulsed laser transmitter and optical receiver to determine the presence or absence of foliage in predetermined spray zones to selectively control spraying only in those spray zones where foliage has been sensed. Range and distance data are also collected and stored in a microprocessor for use in determining the appropriate zones requiring spraying.

23 Claims, 7 Drawing Sheets

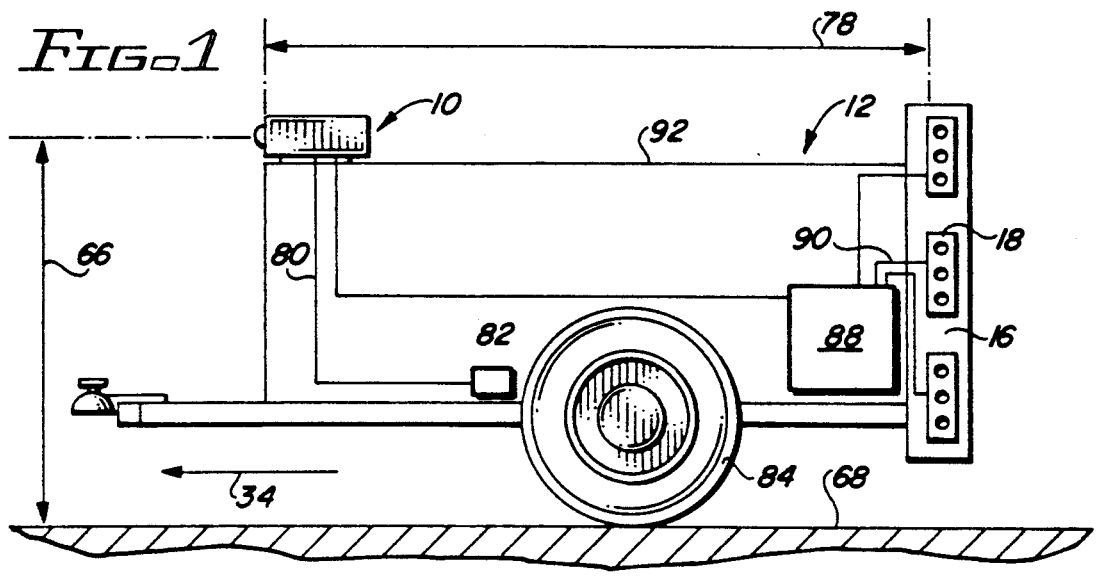
FIG-1
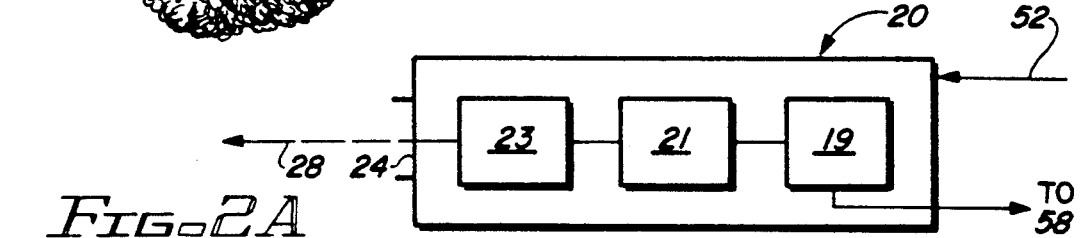
FIG-2
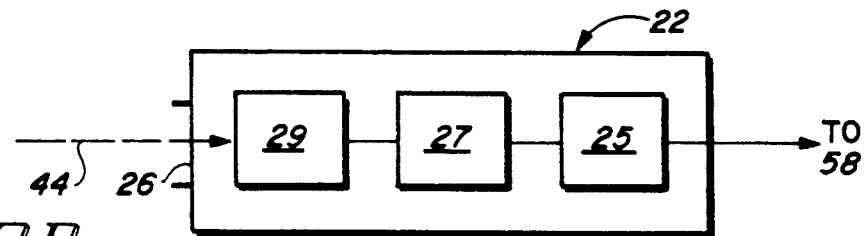
FIG-2A
FIG-2B

OBJECT SENSOR AND METHOD FOR USE IN CONTROLLING AN AGRICULTURAL SPRAYER

BACKGROUND OF THE INVENTION

1. Field of the Invention

The invention relates to the sensing of an object, such as foliage, using laser optics. A size of the foliage is determined for controlling the amount of a selected spray material needed to be directed at the foliage for an appropriate agricultural spraying application.

2. Background Art

The spraying of chemicals on plants for nutritional, disease and pest control purposes is a vital factor in maintaining the high level of productivity which has come to characterize the agricultural art. With this spraying comes concern about pollution of our environment, particularly our water supply. There are thus environmental as well as an economic incentives for optimizing the chemical spraying process so that the greatest agricultural benefit is achieved with the least damage to the environment. Optimization of the spraying process continues as new technology becomes available. This is aptly illustrated by the evolution of mobile agricultural sprayers used for spraying trees in groves and orchards.

Early grove sprayers employed pressurized nozzles at the end of a wand which an operator moved around so as to direct the spray over the entire canopy of a tree. In a subsequent improvement, several wands were attached to a pipe mounted to a swivel at the rear of a pump/tank trailer. The operator set the elevation angles of the wands according to tree size and swiveled the entire assembly back and forth to facilitate spray penetration of the foliage. By varying the nozzle pressure and orifice size, the operator controlled the flow rate, droplet size, and the force of the flow stream. The operator had to estimate the size of the tree and how long to apply spray to achieve appropriate coverage. The operator could turn off the spray between trees by means of valves to each wand. These early sprayers were cumbersome and time consuming to use.

The development of the air-blast sprayer as disclosed in the U.S. Pat. No. 2,475,449 issued to G. W. Daugherty on Jul. 5, 1949, "Spraying Machine," improved sprayer effectiveness by removing the operator from the spray zone, approximately doubling the acreage sprayed per day and providing a more thorough spray coverage of foliage. The air-blast sprayer used large volumes of high speed air at approximately 100 miles per hour (mph) to propel the droplets ejected from pressurized nozzles. Swirl plates beneath the nozzle orifices were used to enhance the backup of droplets as they entered the air stream. The spray vehicle moved at approximately 0.5 mph to 1.5 mph between rows of trees, spraying the trees on either side at a typical spray material application rate of approximately 500 to 1500 gallons of chemical/water mix per acre. The air-blast sprayers were not turned off between trees or at gaps where trees were missing or where short replants were located.

Although the air-blast sprayer was an improvement over previous devices, its use of highly diluted solutions had undesirable consequences. There was a substantial loss of chemicals from foliage due to runoff which deposited the chemicals in the soil, thereby degrading its fertility. In addition, the use of large amounts of water required large and heavy equipment which led to high fuel consumption.

The use of concentrated solutions in sprayers requires uniform spray distribution and accurate spray metering to avoid the chemical waste and possible vegetation damage occurring from chemical over-concentrations and to avoid the ineffectiveness of the spray function resulting from under-concentrations. U.S. Pat. No. 3,489,351 issued to J. M. Patterson on Jan. 13, 1970, "High Concentrate Sprayer," discloses modifications to the air-blast sprayer design to provide accurate spray metering and uniform spray distribution. Two blowers in a vertical stack are employed having axial inlets and radial outlets ducted together to blend the flows into a uniform speed air blast from the top to the bottom of the tree being sprayed. Accurate spray metering is achieved using a proportional ground speed pump drive and proportioning ceramic orifices. Typical application rates from 100 to 250 gallons of water/chemical per acre were achieved.

U.S. Pat. No. 4,768,713 issued to B. E. Roper on Sep. 6, 1988, "Grove Sprayer," discloses the use of an ultrasonic sonar-type sensor to detect the presence of tree foliage as a spray vehicle traveled through the grove. Multiple spray nozzles and a plurality of associated foliage sensors are positioned at elevation angles such that spray coverage is divided into several zones corresponding to the expected variations in tree height. Foliage is then permitted only in the zones where foliage is detected. Using special nozzles in a high-speed air blast of approximately 200 mph and a water/chemical feed rate proportional to ground speed along with zone spraying achieves an effective spraying process. Typical application rates of one to ten gallons per acre are achieved. By traveling at sprayer travel speeds of approximately 10 mph, 150 acres per day can be sprayed. Beyond this increased productivity, the use of the ultrasonic sonar-type sensor has reduced water, chemical and fuel usage and greatly reduces soil and water pollution.

U.S. Pat. No. 4,823,268 issued to Durham K. Giles et al. on Apr. 18, 1989, "Method and Apparatus for Target Plant Foliage Sensing and Mapping and Related Materials Application Control," discloses an electronic orchard tree measuring system based on the use of a plurality of ultrasonic range transducers for determining the amount and vertical distribution of sensed load centroids in vertical sectors of orchard trees. The ultrasonic transducers may be operated independently of any processor or memory which receives their distance data outputs. Displacement sensing of the apparatus relative to a row of target trees may instead be used to select ultrasonic distance data at predetermined incremental distances of travel relative the trees being sensed. Thus, the most recent value of sensed data is always available as input to the processor or memory without requiring any timing circuitry between such sensing and control circuits. The detection may be stored in memory for subsequent processing to create a map of foliage volumes of the sensed target trees. Alternatively, the spatial characteristics of the sensed amount and vertical distribution of load centroids for a given vertical segment of target trees may be further compared spatially with determined application patterns of controllable spray nozzles to configure subsequent activation of such nozzles for optimal material application to the given vertical segment of the sensed target trees.

U.S. Pat. No. 5,172,861 issued to Lenhardt on Dec. 22, 1992 discloses an agricultural sprayer comprising an oscillating sensor that detects the foliage location and turns nozzles off and on to spray different foliage locations. The sensor includes an ultrasonic device for directing a beam of ultrasonic energy towards a selected target and sensing the reflection of ultrasonic energy off that target. The sensor has a horn for further directing the ultrasonic sound in the direction of a predetermined spraying zone. A stepper motor rotates the horn of the foliage sensor into various orientations where the foliage is sampled. A distance signal is sent to a computer system which determines if the distance in a sampled zone is within a predetermined range. After determining the range of the distance signals, the computer system enables solenoids to spray zones having distance signals in the predetermined range. If the computer determines that the sensed foliage in a zone is outside the predetermined range, the solenoids for that spray zone are disabled. The disclosure recognizes the need and value in having a single sensor in the sprayer control system.

The object sensor were developed by the inventors as an outgrowth of several laser systems developed for Department of Defense programs. Typically military use of laser optics and electronics is in missile systems and target recognition systems. Target images are produced and are seen as a missile or carrier flies over a targeting area. For example, a missile may be equipped with a laser range finder scanning in a plane perpendicular to the flight path. Range-image sensors have been developed which employ two mirrors having orthogonal axes of rotation t scan a diode-laser rang finder in elevation and azimuth. This provides angle-angle-range data from which three dimensional images have been constructed. The ranging and imaging capabilities of this type of sensor are well suited for submunition target recognition and identification applications.

Optical dimensioning techniques have been incorporated in industrial uses as disclosed in U.S. Pat. No. 4,179,216 issued to Josef Theurer and Klaus Riessberger on Dec. 18, 1979, "Apparatus for Measuring the Profile of a Railroad Tunnel." In this patent, a mobile apparatus for measuring the profile of a railroad tunnel comprising a car mounted for mobility on the railroad track, a beam emitter and receiver instrument capable of continuously receiving a signal corresponding to the distance of the tunnel profile from the instrument, a rotatable axle supporting the instrument on the car for pivoting about an axis extending parallel to the longitudinal track axis, and a drive arranged to pivot the instrument about the axis extending parallel the track axis whereby the instrument may sweep the profiler and continuously receive the signal. The same inventors disclose a similar use for the sensor in their U.S. Pat. No. 4,490,038 issued on Dec. 25, 1984, "Mobile Apparatus for Determining the Lateral Position of a Railroad Track." In this patent the laser beam emitting and receiving instrument is focused for measurement of the distance to an adjacent railroad track.

SUMMARY OF INVENTION

The present invention contemplates the use of an object sensor and method for determining the presence and size of foliage, such as trees or row crops, for purposes of spraying, counting or measuring the size of the foliage. The sensor is affixed to a mobile agricultural sprayer which is traveling along side the foliage. The sensor comprises a laser range finder that scans on both sides of the moving sprayer in a plane perpendicular to the motion of the sprayer. One objective of the invention is to provide a single laser sensor and an improved method for retrofitting the sensor onto a commercially available agricultural sprayer. When the laser sensor detects the presence of foliage, it provides a signal that activates a spraying system for the spraying of selected materials only when foliage is within a spray range of the sprayer. Primary objectives of this invention include the economic benefit of optimal chemical usage as well as the important benefit of reduced environmental pollution.

The laser sensor for detecting the presence of the tree foliage useful in controlling the agricultural sprayer having controllable sprayer heads comprises a laser range finder for determining a range from the laser sensor to the tree foliage of a target tree located in a row of such target trees along which the sensor is transported and for providing respective range data outputs corresponding with a sensor angle for each range data output which outputs are updated for each cycle of range determining means on a continuous basis. Means are provided on the mobile agricultural sprayer for determining a travel distance of the sensor as it travels along the row of target trees, the travel distance being used to account for the distance between the sensor and the controllable spray heads.

Means are also provided for processing the respective range data output and travel distance for determining the presence and size of sensed target trees. The processing provides control signals to the agricultural sprayer controllable spray heads.

The laser sensor employs a pulsed time-of-flight range measuring system having separate apertures placed side-by-side for the laser transmitter and receiver. The laser beam and receiver field-of-view are continuously scanned in a vertical plane which is perpendicular to the forward motion axis of the agricultural sprayer. In a preferred embodiment a rotating mirror is used to create the scanning. The position of the mirror, and correspondingly the laser beam is determined by means of a shaft encoder attached to the mirror drive motor shaft. In this way, a single sensor can make range measurements on both sides of the sprayer vehicle as it travels between rows of trees or other crops and foliage.

In one embodiment, it is an objective to provide a system for controlling the application of selected spraying material to respective target trees arranged in generally regular equidistant rows forming a grove, the system useful in controlling a mobile agricultural sprayer having controllable sprayer heads. Means are provided for determining a travel distance along the row of target trees for the sprayer and outputting an incremental movement signal indicative of the length of travel. A single optical sensor range determining means is situated at a predetermined location on the sprayer and forward of the distribution means with respect to the direction of travel of the sprayer. The range determining means measures the sensor to tree height distances for corresponding angles of reference for the sensor. The range determining means is operated in common measurement scanning cycles to a designated travel distance measurement. Means for controlling the material distribution means are provided and is operatively associated with each of the material distribution means. The controlling means is selectively and respectively actuating the material distribution means and is responsive to the incremental movement signal for reading the most current measurement cycle set of respective range data from the sensor. The relative size of the target tree is calculated for a corresponding set of travel distance data. A time measurement difference between the scanning cycle generated by the sensor for a particular location and the separation of the corresponding material distribution means control based on a distance between the sensor and the distribution means is accounted for when the distribution means are actuated. One embodiment anticipates that the distribution means are comprised of respective solenoid-actuated spray nozzles and the distribution control means comprise respective solenoids for each of a plurality of spray nozzles for actuation. The solenoids are thus operated by the control means to define a selected configuration of actuated spray nozzles resulting in an optimal material spray application to a sensed target tree.

Another embodiment of the invention concerns a method useful in controlling an application of selected spraying materials from a mobile agricultural sprayer onto target trees. For trees generally arranged in regular equidistant rows forming a grove, the sprayer travels along an axis parallel to and between the rows. The method comprises the steps of providing a laser beam transmitter and an appropriate optical receiver for the laser beam. The laser beam is scanned across the target trees where predetermined spray zones have been identified. A range and angle for a plurality of elevations for the target tree is determined along with the distance traveled by the sprayer. The range, angle and distance data are processed for initiating a spray signal that is appropriate for a given target tree and zone within that target tree.

In the preferred embodiment, the method disclosed utilizes a microprocessor which provides for the initializing of target tree spray zones. The spray zones are defined by minimum and maximum target tree heights. The tree heights are obtained from the ranges and corresponding angles measured during the scanning cycle. In this embodiment, the transmitter is disabled during a portion of the scanning cycle where the ranges have been predetermined to be inappropriate for the spray application. The range measurements are obtained for the scanning laser beam at their respective angle. Tree height measurements are then calculated using the range measurements and the angles associated with the range measurements. The ranges and angles, each range and angle associated with an appropriate zone, are stored for processing needed to actuate the spraying process but are also stored for in tree counting, sprayer speed determinations, acreage sprayed calculations and other data useful in analyzing the spraying process.

The embodiment disclosed focuses on determining the spray signals appropriate for the target tree zones. By accounting for the separation between the sprayer heads and the location where a range measurement was taken, the appropriate spray signals is initiated for the appropriate spray zones.

While particular exemplary embodiments are disclosed in both methods and apparatus for this invention, those of ordinary skill in the art will recognize numerous possible variations and modifications. All such variations are expected to come within the scope of the present invention.

BRIEF DESCRIPTION OF DRAWINGS

A complete and enabling disclosure of the present invention, including the best mode thereof, is directed to one of ordinary skill in the art in the present specification, including reference to the accompanying figures, in which:

FIG. 1 illustrates a partial side view of an air-blast type agricultural sprayer with a sensor located on the sprayer and forward of the spray heads;

FIG. 2 is a schematic diagram of the sensor illustrating the functional flow relationship of sensor elements;

FIG. 2A is a schematic diagram of the laser transmitter illustrating the relationship between the laser device and the lens/prism system;

FIG. 2B is a schematic diagram of the optical receiver illustrating the relationship of the receiving objective lens and the photodiode converting the optical signal to a current pulses which are then converted to a voltage signal using a conventional transimpedence amplifier;

DETAILED DESCRIPTION OF PREFERRED EMBODIMENT

Figure 2C:
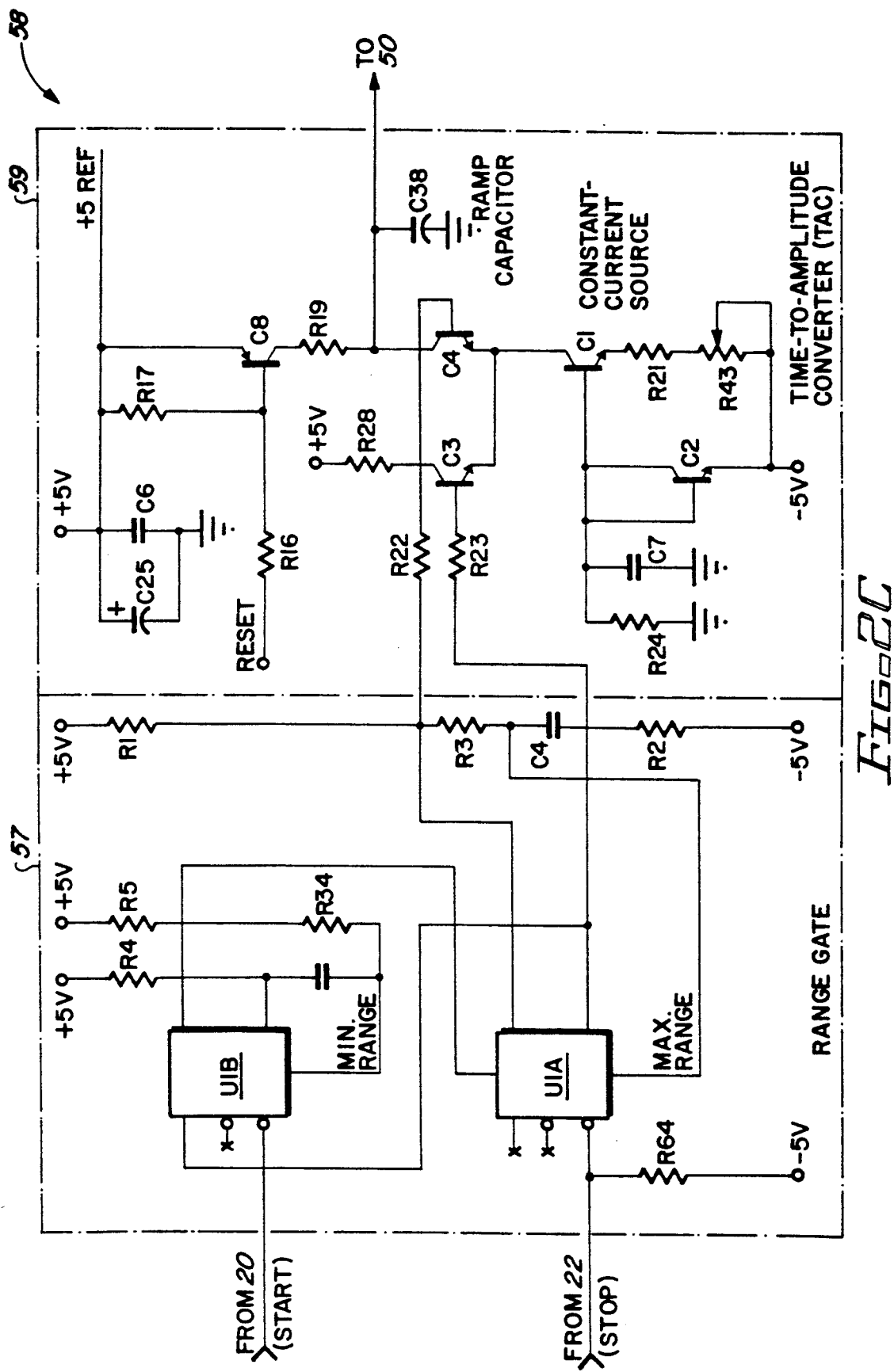
FIG. 2C is a schematic diagram of the time-to-amplitude circuitry used in the preferred embodiment.

In the preferred embodiment of the invention, a sensor 10 is affixed to a conventional air-blast type agricultural sprayer 12 of the towing trailer style. FIG. 1 illustrates the typical air-blast fan 16 type agricultural sprayer 12 and shows the sensor 10 located on the sprayer 12 forward of the spray heads 18. The invention concerns both the method and apparatus used to sense target trees 14 and initiate the spraying of these trees 14 based on sensing the presence of a target tree 14, and identifying the foliage signature associated with each tree.

The sensor employs a pulsed time-of-flight range measuring system illustrated in FIG. 2. A laser transmitter 20 and optical receiver 22 having separate apertures 24 and 26 respectively are placed side-by-side as illustrated in FIG. 2. The transmitted laser beam 28 and receiver 22 field-of-view are continuously scanned by a rotating mirror 30 in a vertical plane 32 which is perpendicular to the travel axis 34 of the sprayer 12. The position of the mirror 30 and correspondingly, the laser beam 28 is determined by means of a shaft encoder 36 affixed to the mirror drive motor shaft 38. With this configuration, a single sensor 10 makes measurements of ranges 40 between the sensor 10 and the target trees 14 on both sides of the agricultural sprayer 12 as it travels between rows 42 of target trees 14 or other crops. FIG. 3 illustrates this by showing a partial aerial view of a sprayer 12 at a first location 12A and a second location 12B between the rows 42.

As illustrated in FIG. 2A, the laser transmitter 20 lens system and circuitry employs a diode laser 19 as an optical source. By way of example, a conventional InGaAs strained layer quantum-well-structure injection laser 19 configured in a pulsed circuit is used to emit 13 nanosecond pulses having a peak radiant flux of approximately thirty watts at 0.91 microns. The diode laser is driven with fifty amp current pulses generated by an avalanche-transistor pulser well known in the art. The 381 micron laser 19 diode junction emits radiation into a 10 by 40 solid angle. A fast focal length (f:0.91) multi element lens 21 having an effective focal length of, for example, on the order of 8.8 millimeters is used to collimate the diode laser emission, resulting in a beam divergence of 46.6 miliradians parallel to the diode junction and 0.12 miliradians perpendicular to the diode junction. The collimated laser beam is expanded by a factor of six in the direction parallel to the diode junction using an anamorphic prism 23 pair resulting in a 7.8 miliradians parallel and 0.12 miliradians beam divergence for the laser beam 28 emitted through the aperture 24.

As illustrated in FIG. 2B, the optical receiver 22 utilizes a lens system and circuitry comprising an objective lens 29 and a silicon PIN photodiode 27 receiving the laser beam 44 at its aperture 26 after it has been reflected from the target tree 14. A conventional transimpedence amplifier 25 converts the photodiode current pulses to voltage pulses. Optical return radiation representing the reflected laser beam 44 incident upon the objective lens 29 is focused onto the receiver 22 photodiode 27. The receiver field-of-view is given by the ratio of the photodiode 27 diameter to the receiver lens 29 focal length and, by way of example, may be on the order of 13 miliradians. This value is sufficiently large to facilitate bore sighting the receiver 22 to the 7.8 miliradians transmitter beam width.

Figure 4:
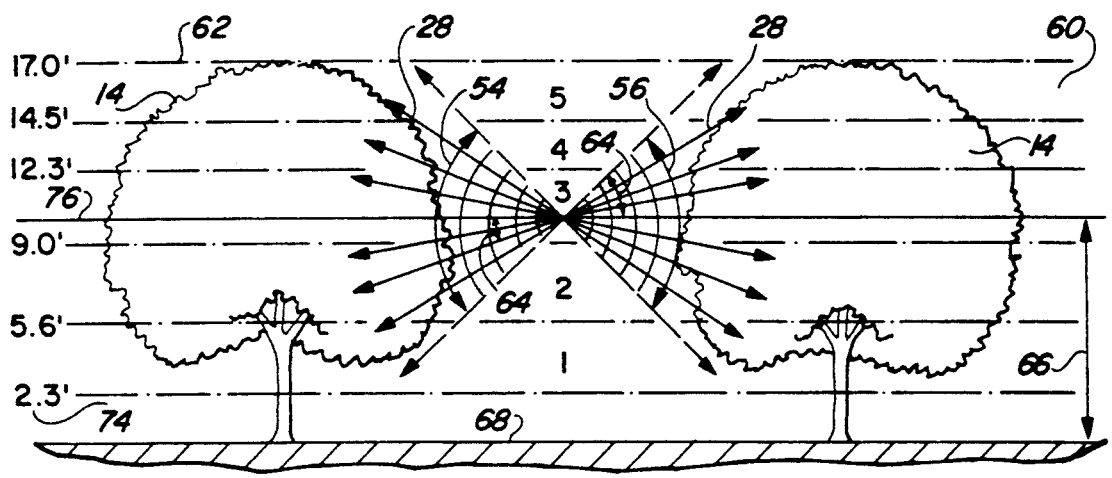
FIG. 4 illustrates the laser beam scanning of an exemplary set of identified zones used in the application of herbicides to citrus trees in a typical citrus grove

Referring again to FIG. 2, the shaft encoder 36 used in the preferred embodiment pulses the laser 19 at a preselected pulse rate, for example, on the order of 2,048 pulses per revolution. This results in range measurements being made at every 3.06 miliradians about the axis 38 of the mirror rotation. With the motor 46 providing a mirror 30 rotation rate of 40 revolutions per second (rps), the laser pulse repetition rate is at 81.92 thousand cycles per second (kHz). In the preferred embodiment, an on-board styled microprocessor 50 is employed that limits the repetition rate to 15 kHz based on the microprocessor cycle time. The shaft encoder 36 delivers pulses at a rate of 512 pulses per revolution at an angular rotation rate of 29.29 rps. The microprocessor 50 controls the triggering of the laser transmitter 20 by sending pulse trigger signals 52 which are selected to limit the laser 20 operation to quadrants of rotation on the left and right sides of the sprayer 12 corresponding to tree height, a left scan quadrant 54 and a right scan quadrant 56 as illustrated in FIG. 4. The laser transmitter 20 is triggered 128 times in each of the preselected tree-occupied quadrants 54 and 56.

Figure 3:
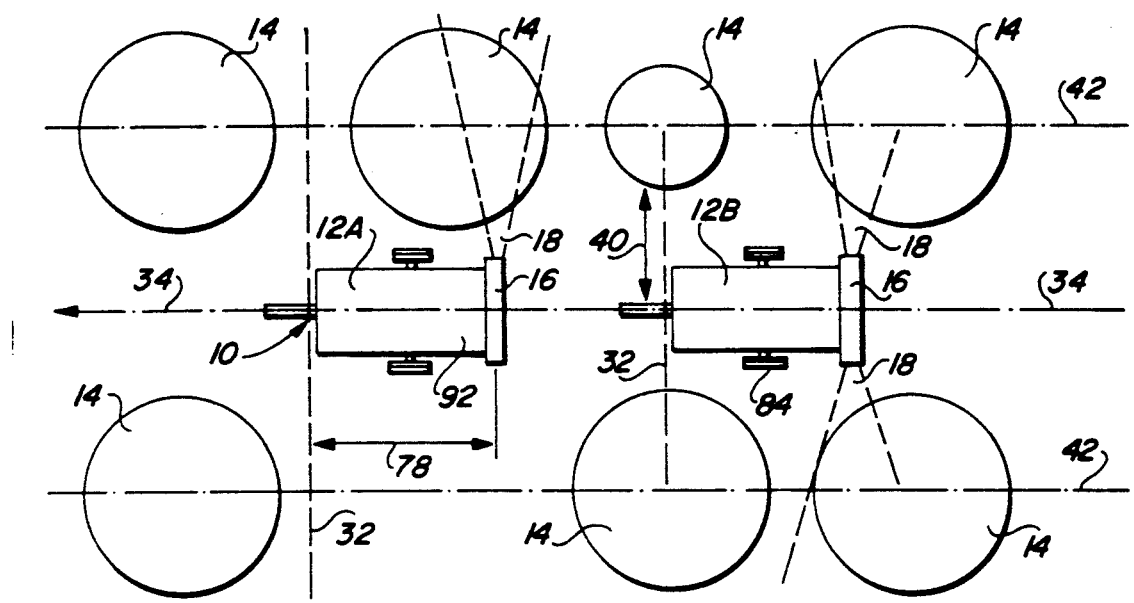
FIG. 3 is a partial aerial view illustrating various positions of the sprayer traveling between rows of target trees.

With continued reference to FIG. 2, the sensor 10 determines a range 40 by measuring the time for one emitted pulse as it leaves the laser transmitter 20 and returns to be detected by the optical receiver 22. This round trip time is divided by two to obtain the time to travel to the target tree 14 and multiplied by the speed of light, the speed of the laser beam 28. An accurate measure of the range 40 is required and thus an accurate measurement of the time is needed. To this end, the sensor system 10 of FIG. 2 includes a range measurement circuit 58 comprising a range gate 57 and an analog time-to-amplitude converter circuit (TAC) 59 as detailed in FIG. 2C. This range measurement circuit 58 is optically coupled to the laser 19 as means for initiating a start pulse for the range gate. A stop pulse for the range measurement circuit 58 is provided by a threshold detector contained within the receiver 22.

While it is appreciated by those skilled in the art that both digital and analog techniques may be used for making the time interval measurement in order to accurately measure the propagation time of the laser pulse to the target and back to the receiver, the analog technique has been chosen in the present invention because of its better resolution, smaller size, simpler circuitry, lower power consumption and lower costs when compared with the digital technique. The analog range measurement technique specifically used in the present invention is known as a "time-of-flight converter" and has an accuracy of about one percent of measured range and a resolution of about plus or minus five centimeters.

Referring again to FIG. 2C, the specific forms of the range gate 57 and TAC 59 are shown and use a constant current source including transistor Q1 to charge a ramp capacitor C38 to obtain a linear voltage ramp whose instantaneous value is a measure of elapsed time. The TAC 59 circuit is designed so that the voltage across the capacitor C38 begins ramping down from the positive power supply when the laser 19 fires. The ramp is stopped when either a reflected pulse is received by the receiver 22 or at the end of a measured period of time. A maximum range and thus a maximum measured time period is preselected as an initial value. The output of the TAC 59 is then converted to a digital format by a ten bit analog-to-digital converter within the microprocessor 50.

In the preferred embodiment, the start timing pulse for the TAC 58 is generated by the shaft encoder 36 with a simultaneous pulse 52 causing the laser transmitter 20 to fire.

Referring to FIG. 2, the microprocessor 50 is programmed to perform three primary tasks which include sensing and calculating tree foliage height 62, activating spray zones 60, and running sensor system diagnostics. To calculate the height 62 of a target tree 14, the range 40 to the tree 14, an angle 64 associated with that range 40, and the height 66 that the sensor is mounted above the ground 68. The microprocessor 50 provides various outputs to light emitting diodes, presence relays for indicating the presence of an object such as foliage, an RS232 computer interface and relays within the power supply. The microprocessor 50 receives inputs in addition to those described that include temperature and real time clock pulses. Backup power and circuitry is also included in the preferred embodiment. Such input/output microprocessor information and backup circuitry is well known in the art.

Figure 5:
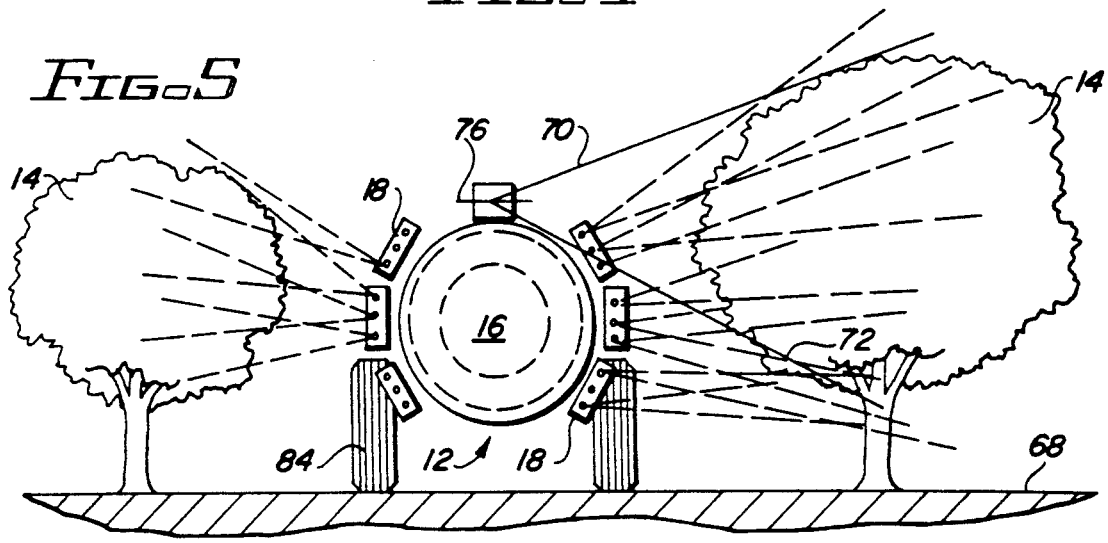
FIG. 5 is a partial rear view of an air-blast type agricultural sprayer illustrating the selective application of spray materials from selected nozzles to target trees.

As illustrated in FIG. 5, when the sensor 10 is scanning in the upward direction, the range 70 to the top of the tree 14 is defined as the last valid range received. The range 72 to the bottom of the tree is defined as the first valid range which produces a height above a minimum height threshold 74. When the sensor 10 is on a downward scan, the range 70 to the top of the tree 14 is defined as the first valid range received and the range 72 to the bottom of the tree 14 is defined as the last valid range which produces a height above a minimum height threshold 74. A valid range is any range 40 less than a predetermined maximum range. Each range 40 reading has a relative angle signal 63 associated with it with respect to the horizontal axis 76 for the preferred embodiment. This angle signal 63 is determined by a counter 65 that is incremented each time the shaft encoder 36 moves one cycle. In the preferred embodiment, the shaft encoder has 512 cycles per revolution. Therefore, one tick on the counter translates to an angle 64 of approximately 0.7 degrees and provides an angle signal 63 to the microprocessor 50.

Since the sensor 10 is mounted at a fixed height 66 above the ground 68, the height to the top 62 or bottom 72 of the target tree 14 can be calculated by multiplying the range 40 measured at a given angle 64 by the sine of that angle 64 and adding the height of the sensor 66 to that product.

A corresponding mathematical formula takes the form:

$$Height(tree) = Height(sensor) * SIN(Angle)$$

where the Range 40 is defined to be less than a predetermined maximum range and the angle 64 takes on predetermined values between −45 and +45.

Figure 6:
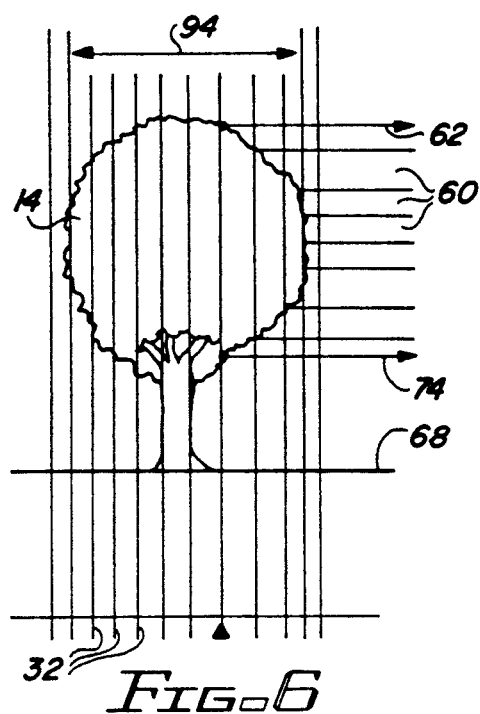
FIG. 6 illustrates the relationship between zones and tree size for a particular measurement location.

The agricultural sprayer 12 comprises spray heads 18 in the form of controllable nozzles in the preferred embodiment. The heads 18 are aimed and grouped into zones 60 according to the particular task the sprayer 12. In the embodiment presently in use in a typical Florida orange grove, five zones are used with the top of the highest zone at approximately seventeen feet. The number of zones 60 and the size will vary based on the specific target crop or task. After the height 62 of a tree 14 is calculated, the appropriate zones are identified and the corresponding spray heads 18 are turned on. All appropriate zones 60 as illustrated in FIG. 4 between the bottom 74 and the top 62 of the target tree 14 will be turned on. As illustrated in FIG. 5, only those zones 60 appropriate for a given target tree 17 are turned on for applying the spray materials. FIG. 6 further illustrates that only those zones 60 for the scanned measurement location 61 will be activated for spraying.

Figure 7:
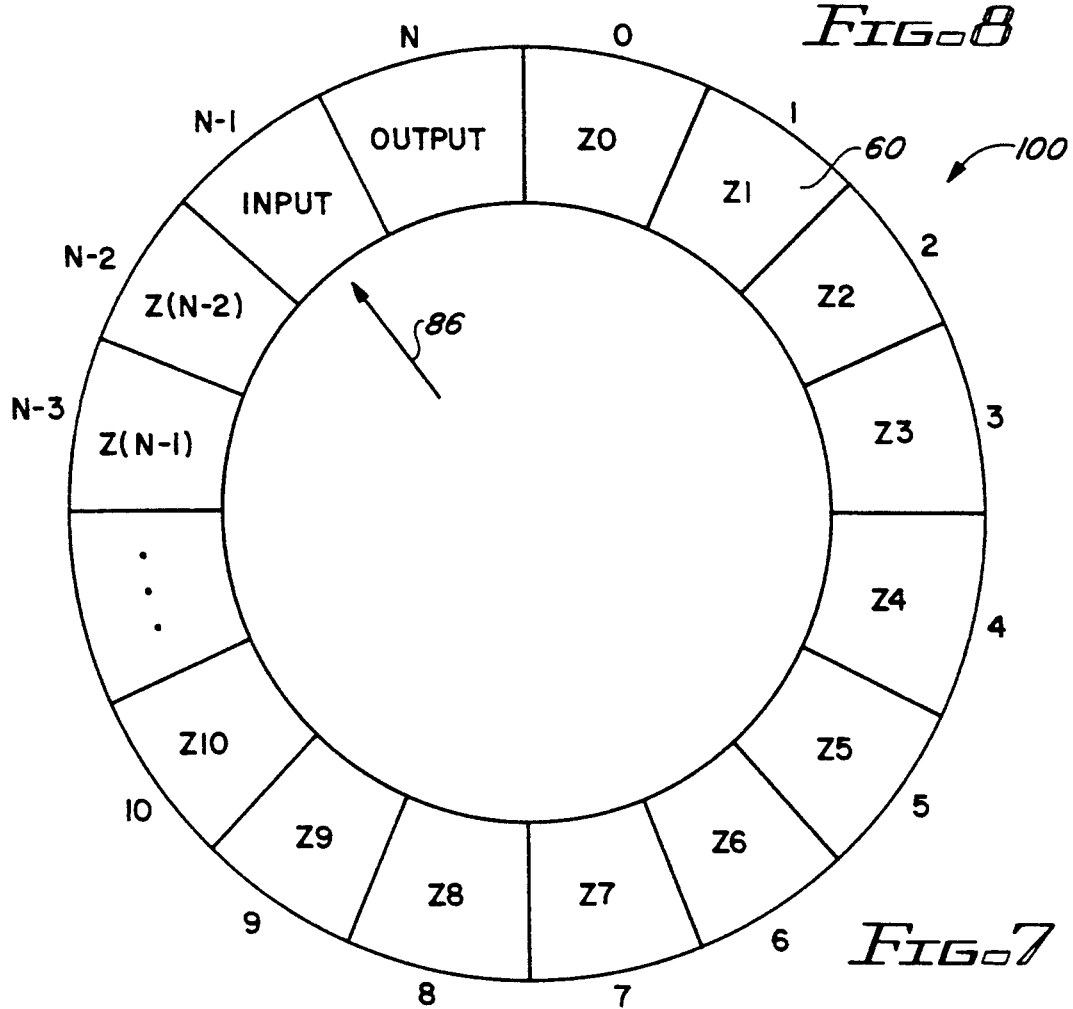
FIG. 7 illustrates the circular queue data structure for a plurality of zones used in storing scanned range data.

In the preferred embodiment, the laser sensor 10 is mounted on the sprayer 12 about sixteen feet forward of the Spray heads 18. There is a time delay between the time the sensor 10 takes measurements of a target tree 14 and the time that the spray heads 18 reach the target tree 14 as illustrated in FIG. 3. The microprocessor 50 determines when the fixed distance 78 between the sensor 10 and heads 18 has been covered based on a distance pulse signal 80 from a sensor 82 communicating with the wheel 84 of the sprayer 12. The data indicating which spray zones 60 to activate is stored in the microprocessor 50 in a circular queue styled data structure 100 as illustrated in schematic form in FIG. 7. When the distance pulse 80 is received, the current zone data is stored in the queue 100 at a current pointer 86 location. The queue pointer 86 is then incremented each time a distance pulse 80 is received by the microprocessor 50. In the case of the preferred embodiment, when the sprayer 12 has traveled sixteen feet, the time-delayed zone data is read from the queue and used to activate the spray heads 18. The preferred embodiment comprises electronically switchable solenoids 88 affixed proximate to the spray heads 18. The solenoids 88 controllably interrupt respective flow lines 90 to the heads 18. The lines 90 are connected to the holding tank 92 containing appropriate spray material mixtures for the task at hand.

After initializing the microprocessor 50, range 40 and angle 64 data is stored for subsequent target tree 17 height calculations. Based on the tree heights measured and the established spray zones 60, sprayer heads 18 communicating with the storage tank 92 are activated and release the selected spray material. This process is illustrated in FIG. 8 showing a top level flow chart designated 200.

Figure 8:
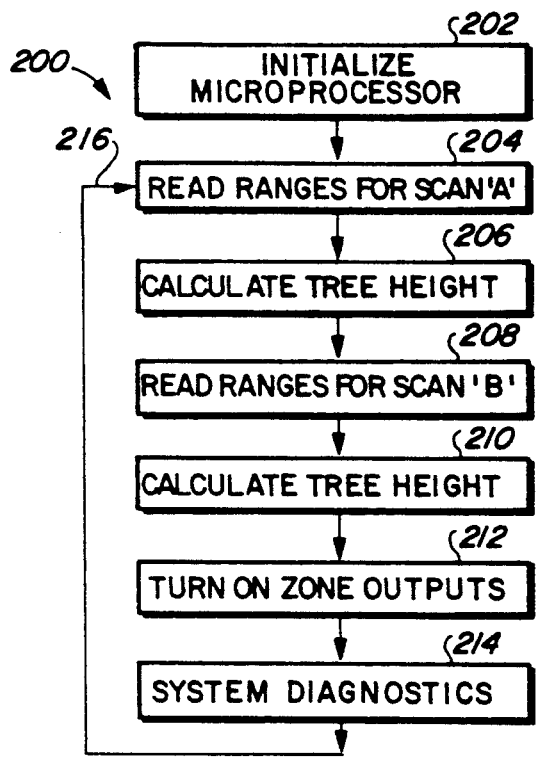
FIG. 8 is a sensor top level flow chart of the microprocessor software illustrating the steps from initializing to initiating spray application signals.

Referring to FIG. 8, it is seen that the microprocessor 50 is first initialized 202. After a scanning of the laser sensor 10, a range including time-of-flight distance and corresponding angle are read 204 and stored in the microprocessor 50. Using the above described formula, a tree height is calculated 206 from the measured range. The sensor height 66 is input as an initial value. This process of scanning continues 208 and heights calculated 210 so that the predetermined spray zones can be activated 212. In addition to the range calculations and initiating of spraying for recognized foliage zones, a system diagnostic is generated 214 and fed back to the start of the scanning cycle as means for resetting or sending a signal to a sprayer operator.

Intermediate process functional flow is illustrated in FIGS. 9 through 13 as further disclosure of the functional logic. These functional flow charts further detail the software logic and are illustrative of the software used in the preferred embodiment for controlling the spraying of an orange grove having rows 42 of target trees 14 as earlier described. Each figure is identified by a number designation stepping from 300 to 700 for the respective FIGS. 9 through 13.

With reference to FIGS. 9 through 13, the detailed logic is described. As discussed earlier, the microprocessor 50 is initialized 302 with information comprising the sensor height 66, a maximum range and a minimum range to be considered, and angles that correspond to designated spray zones 60. In the illustrated embodiment, a forty five degree angle above and below the horizontal 76 has been predetermined for establishing the limits where range data is to be taken. These initial values are selected based on the given scenario for the spraying task at hand. As discussed, the microprocessor 50 also provides system diagnostics 304. The system diagnostics 304 provides a failure warning indicating to the sprayer operator that a failure exists in the system, as an example, a malfunction in the laser. A built in test process provides display to the operator and in the described embodiment does not stop the spraying operation but warns the operator that he may have to switch to a manual operating process for the sprayer. The operator can control the spray heads 18 manually with an override switch.

Figure 9:
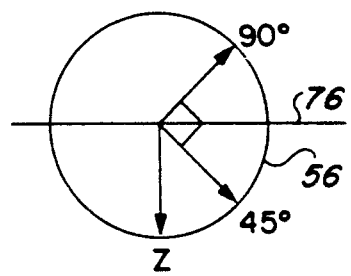
Figure 10:
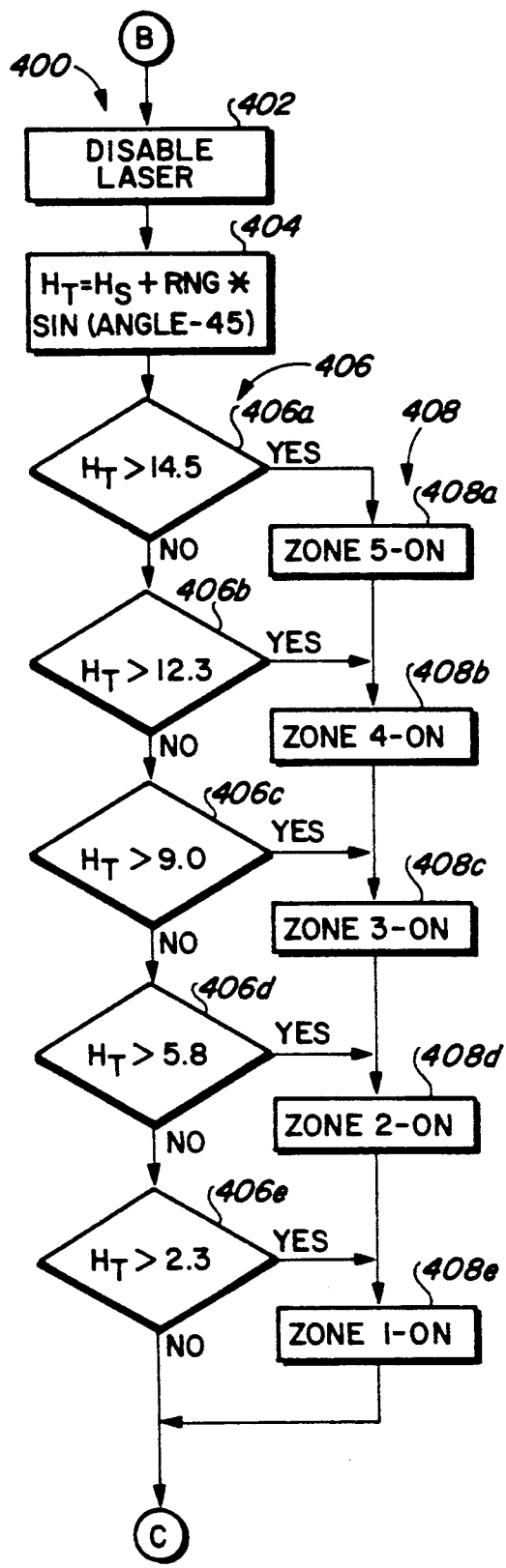

The system is set to wait for a reference pulse 306 that established a direction from which angles will be measured. In the illustrated embodiment, a reference direction is selected to be vertically downward. This direction is identified in the software as a "z" pulse and is illustrated in FIG. 9. Once the z pulse is received, the processor waits for an indication that the scan has passed through a forty five degree angle 308 in the counter clockwise direction for this illustration. This 45 angle corresponds to the range to the bottom of the tree 72 as earlier described. FIG. 5 illustrates this range 72. This angle is preselected as that angle which will enable the laser to fire 310. A range is read 312 and the range and corresponding angle are stored 316 if the range is less than the initialized predetermined range 314. Once the measures range has been stored or if the measured range exceed the maximum, the sensor 10 is scanned through another incremental angle 318. This process of reading 312, comparing and storing continues until the scanning completes a 90 arc 320 as measured from the 45 arc that caused the laser to be enabled 310.

After the scanner passes through the 90 arc designated to be the right scan quadrant 56, the laser is disabled. The range and angle measurements made are used to calculate tree height 404 for each incremented angle as earlier described. The various heights measured are compared to initialized predetermined spray zone heights 406 for identifying those zones that are to be turned on 408. In the embodiment illustrated, five vertical zones were identified as being appropriate for the task. As illustrated in FIG. 4, zones 60 were selected between 2.3 feet, 5.6 feet, 9.0 feet, 12.3 feet, 14.6 feet and a maximum of 17.0 feet. It is these zone heights that are compared 406a through 406e and used to determine when a zone 60 designated by zones 408a through 408e is to be turned on for application of the selected spray material.

Figure 11:
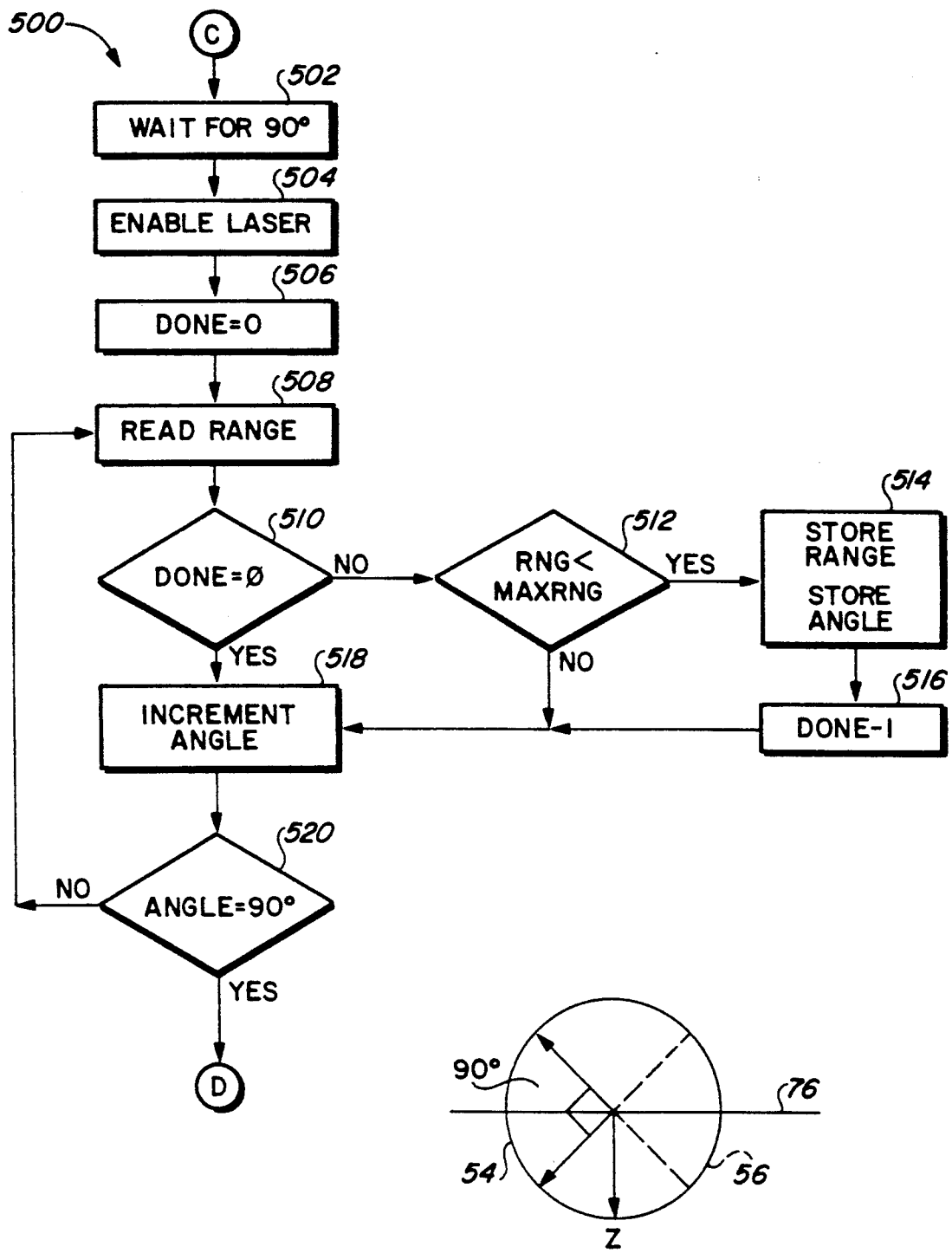

Before the laser is again fired for taking range measurements, the sensor 10 is scanned through another 90 502 as illustrated in FIG. 4. The laser is fired and a similar range measurement process 500 is initiated for the left scan quadrant 54. The laser is enabled 504 and a reference established 506 for measuring a next valid range. Once established, the reference is incremented 516 as illustrated in FIG. 11. A range is read 508 in the left quadrant 54 is a similar manner to that described for the right quadrant 56.

As discussed earlier, when the sensor 10 is scanning in the upward direction as for example in the right scan quadrant, the range 70 to the top of the tree 14 is defined as the last valid range received. The range 72 to the bottom of the tree is defined as the first valid range which produces a height above a minimum height threshold 74. When the sensor 10 is on a downward scan as it is during the scanning in the left scan quadrant, the range 70 to the top of the tree 14 is defined as the first valid range received and the range 72 to the bottom of the tree 14 is defined as the last valid range which produces a height above a minimum height threshold 74. A valid range is any range 40 less than a predetermined maximum range.

Ranges and angles are stored 514 if they are determined to be within the maximum identified range 512. Once the range data is stored or determined to be at the maximum range, the scanning angle is incremented 518 and the reading cycle continues until the 90 arc is scanned 520.

Figure 13:
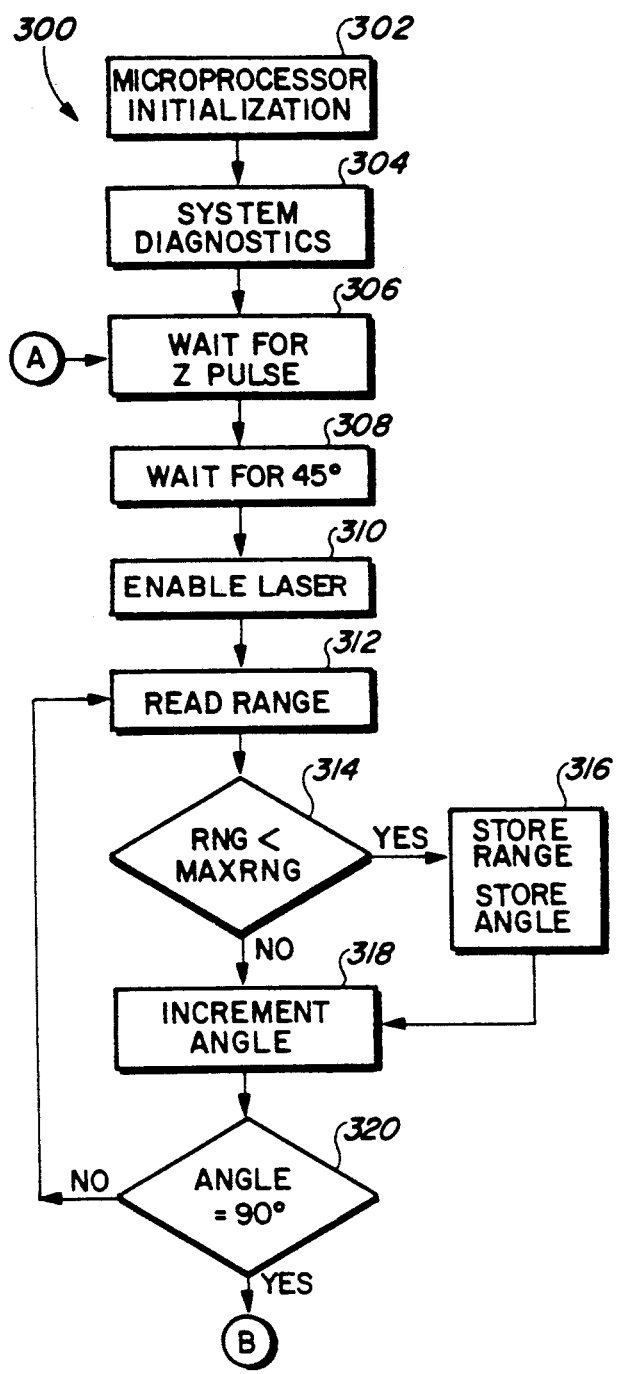
FIG. 9 through FIG. 13 are sensor embedded software flow charts illustrating the various functions used in the storing and processing of range, angle and distance data.
Figure 13:
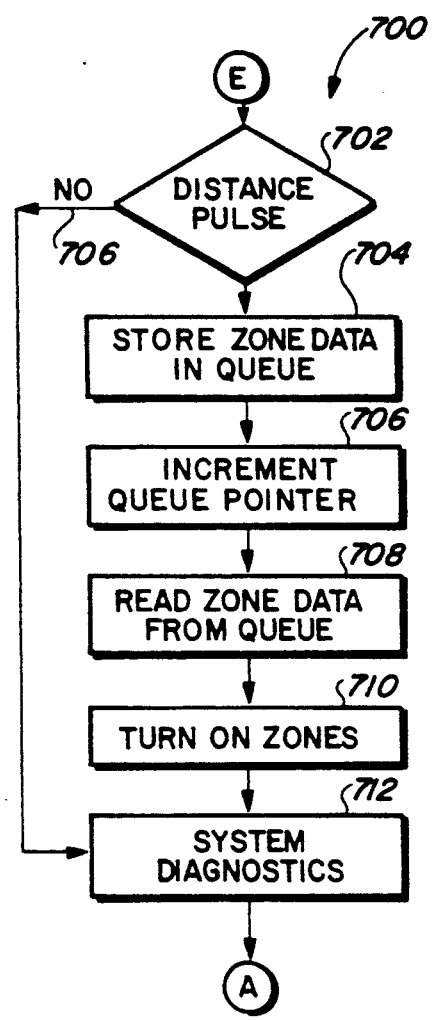
Figure 12:
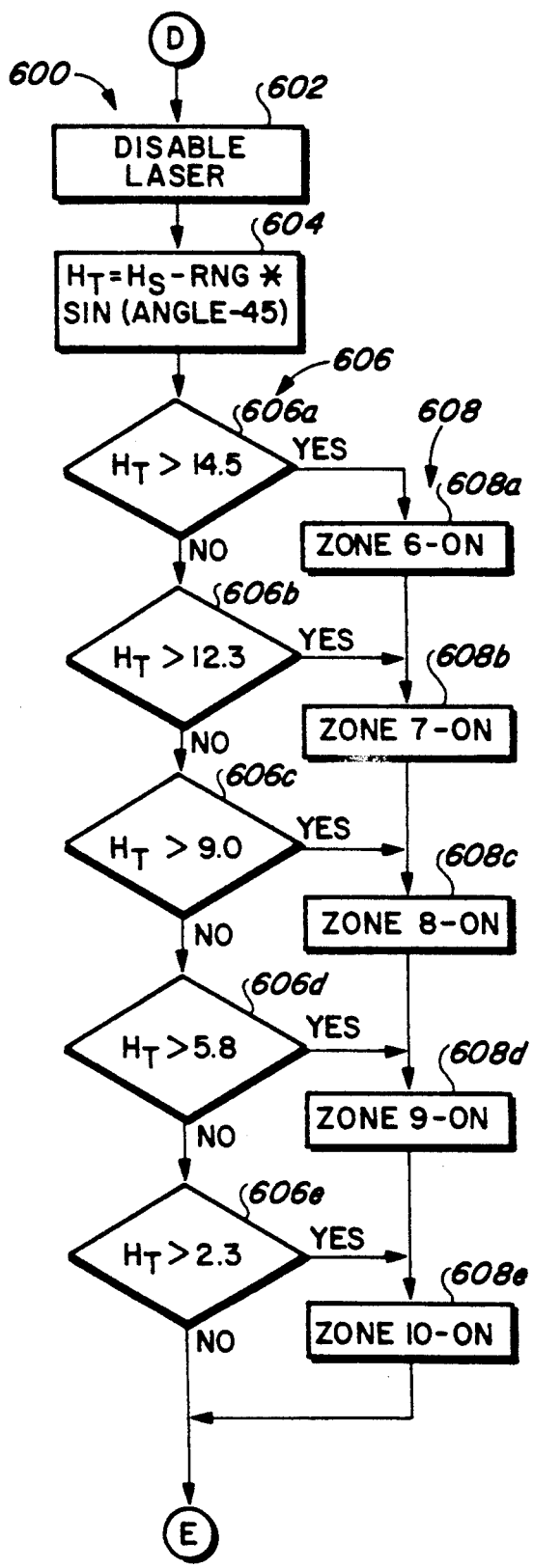

Once the left scan quadrant 54 has been scanned completely, the laser is disabled 602 and the stored data is used to calculate tree heights and corresponding zones as described earlier for the right scan quadrant 56. These zone designations and stored zone on designations are illustrated in FIG. 12 as 606a through 606e and 608a through 608e respectively. As illustrated in FIG. 13, if after scanning both the left scan quadrant 54 and the right quadrant 56, a distance pulse signal 80 is received 702, the zone actuation data is stored in the queue 100 as described earlier. If no distance pulse is received, a system warning pulse 706 is generated for the system diagnostics 712 as illustrated in the flow diagram of FIG. 13. After each set of zone information is stored, the data queue 708 is incremented for storage of subsequent measurements. Zones are then turned on 710 for the spraying process once the spray heads 18 travel a distance 78 to where the appropriate scanned data has been taken. The cycle continues until the task of spraying all of the foliage has been completed.

The microprocessor 50 monitors the operation of the sensor 10 and indicates a failure by turning on status lights on an operator control panel (not shown). It is contemplated that the data obtained in the preferred embodiment will also be used for counting the target trees 17 being sprayed, calculating the speed of the sprayer 12 and using this information to control variable flow heads, determining acreage sprayed, and for false-color imaging well known in the laser imaging art. The entire grove is then mapped for future production accounting an analysis.

In performance tests of the preferred embodiment of the sensor 10, agricultural spraying was controlled with the sensor 10 mounted sixteen feet in front of the spray heads 18 for a sprayer 12 at a height 66 of eight feet above the ground 68. The spray heads are configured as multiple spray nozzles evenly spaced from two to seventeen feet in height on both the right and left sides of the sprayer 12. The distance 78 between the sensor 10 and the spray heads 18 was adjusted to initiate spraying about four inches before reaching a target tree 17 and stopped at approximately four inches after passing the tree 17. During operation in an orange grove, it was verified that spraying occurred only in the vertical zones 60 appropriate to the height of the target tree 17 and only over the width 94 of the tree 17 plus four inches on each side. It is anticipated that various combinations of uses and processing method will be used for the invention based on the multitude of uses for the sensor 10 for agricultural spraying and other general objecting and control needs.

While a preferred embodiment of the invention has been described in detail herein above, it is to be understood that various modifications may be made from the specific details described herein above without departing from the spirit and scope of the invention as set forth in the appended claims.

What is claimed is:

1. A laser sensor for detecting foliage and providing outputs useful in controlling an agricultural sprayer having controllable sprayer heads, the laser sensor comprising:

laser means for determining a range from the sensor to the foliage located in a row of such foliage along which the sensor is transported and for providing respective range data outputs corresponding with a sensor angle for each range data output;

means for determining a travel distance for the sensor along the foliage, the travel distance representing distance between the sensor and the spray heads; and means for processing the respective range data output and travel distance for determining the presence and signature of sensed foliage, the processing means providing control signals useful to the agricultural sprayer.

2. A sensor as recited in claim 1, wherein the laser range determining means comprises:
- a transmitter for emitting a laser beam;
- means for directing the laser beam towards zones on the foliage;
- a receiver for converting a reflected laser beam from the foliage to a signal voltage, the signal voltage representative of a range between the receiver and a defined zone on the foliage; and
- means for scanning the laser beam across the foliage, the scanning means providing means for determining an orientation of the laser beam.

3. A sensor as recited in claim 2, wherein the scanning means comprises:
- a mirror for intercepting the laser beam emitted from the transmitter and reflecting the beam onto a scanning plane, the plane being perpendicular to an axis of a path traveled by the sensor, the reflected beam directed back toward the mirror being similarly directed into as aperture of the receiver;
- a motor having a rotatable shaft affixed to the mirror for continuously rotating the mirror about the axis; and
- an encoder affixed to the motor shaft so as to identify an angular position of the mirror relative to a reference angle.

4. A sensor as recited in claim 1, wherein the distance determining means comprises a wheel rotation sensor for outputting displacement signals indicative of predetermined increments of travel for the sprayer relative to the foliage.

5. A sensor as recited in claim 1, wherein the processing means comprises a microprocessor programmed to receive respective range and distance data for storing and for processing the respective range and distance data for a scanning cycle associated with a distance signal, whereby such processed data results in a size for a plurality of sensed foliage.

6. A sensor as recited in claim 1, wherein the range determining means provides updated outputs on a continuous basis.

7. A apparatus for controlling the application of selected spraying materials onto respective target trees arranged in a grove from a mobile agricultural sprayer, the apparatus comprising:
- means for determining a travel distance along the row of target trees and providing a signal indicating an incremental movement;
- a single optical sensor range determining means situated at a predetermined location on the sprayer and forward of the distribution means with respect to the direction of travel of the sprayer, the range determining means measuring sensor to tree height distances for corresponding angles of reference for the sensor, the range determining means being operated in common measurement scanning cycles to a designated travel distance measurement; and
- means for controlling the material distribution means, operatively associated with each of the material distribution means for selectively and respectively actuating the material distribution means, and responsive to the incremental movement signal for reading the most current measurement cycle set of respective range data from the sensor, calculating relative size of the target tree for a corresponding set of travel distance data, the travel distance correcting for a time measurement difference between the scanning cycle generated by the sensor for a particular location and the separation of the corresponding material distribution means control based on a distance between the sensor and the distribution means.

8. An apparatus recited in claim 7, wherein the distribution means comprises respective solenoids for each of a plurality of spray nozzles for actuation, the solenoids being operated by the control means to define a selected configuration of actuated spray nozzles resulting in an optimal material spray application to a sensed target tree.

9. A device as recited in claim 8, wherein the distribution means comprises a plurality of sets of spray nozzles, each set comprising a manifold further comprising a plurality of spray nozzles.

10. An object sensor useful in the controlling an application of selected spraying materials from a mobile agricultural sprayer, the materials applied to target trees generally arranged in a grove, the object sensor comprising:
- an optical transmitter for emitting a pulsed laser beam through an aperture, the transmitter having a pulse for triggering the output of the beam;
- an optical receiver having an aperture for receiving the laser beam reflected from a target tree and providing an output representative of a range to the target tree;
- means for scanning the laser beam so as to encompass the target tree, the scanning means providing an angle output relative to a reference angle so as to indicate the orientation of the laser beam;
- means for determining a distance traveled by the sensor and providing signal output indicative of a position of the sensor relative to the target tree;
- a microprocessor for receiving range output from the receiver, the angle output from the scanning means, and the distance traveled signal from the distance determining means, the microprocessor storing the outputs for a representative scanning cycle and initiating the trigger pulse to the laser transmitter for subsequent scanning cycles, the microprocessor initiating a controller sprayer activation signal representative of the scanning cycle; and
- a solenoid driver, the driver comprising designated zones, the zones activated by the microprocessor based on appropriate predetermined target tree measurement data.

11. A object sensor as recited in claim 10, wherein the laser beam scanning means comprises:
- a mirror communicating with the transmitter and receiver so as to reflect the laser beam at a forty five degree angle from an axis of travel for the sprayer, the transmitter and receiver being mounted so as to create a side-by-side transmitter and receiver aperture arrangement;
- a motor having a shaft affixed to the mirror so as to rotate the mirror and permit reflected laser beams to be placed in a vertical plane perpendicular to the axis of travel; and
- an encoder affixed to the shaft for providing a position of the mirror relative to a reference position, the encoder providing a signal output to the microprocessor representative of the mirror position.

12. An object sensor as recited in claim 10, wherein the laser transmitter delivers a pulsed laser beam.

13. An object sensor as recited in claim 10, wherein the microprocessor further comprises means for establishing target tree spray zones defined by minimum and maximum target tree heights, the tree heights being obtained from the range output and the corresponding angles.

14. An object sensor as recited in claim 10, wherein the microprocessor further comprises means for disabling the transmitter during a portion of a scanning cycle where the ranges have been predetermined to be inappropriate for the spray application.

15. An object sensor as recited in claim 10, wherein the microprocessor further comprises:
   means for reading the ranges for the scanning laser beam;
   means for calculating tree height using the ranges and the angles associated with the range measurements;
   means for comparing the tree height to a predetermined zone; and
   means for storing the ranges and angles, each range and angle associated with an appropriate zone.

16. An object sensor as recited in claim 10 wherein the microprocessor further comprises:
   means for determining spray signals appropriate for the spray zones; and
   means for initiating spray signals for the spray zone.

17. An object sensor as recited in claim 15, wherein the spray determining means accounts for a separation between the sprayer heads and a range measurement location.

18. A method for controlling an application of selected spraying materials from a mobile agricultural sprayer onto target trees arranged in grove, the method comprising the steps of:
   providing a sensor having a laser beam transmitter and an optical receiver for the laser beam;
   scanning the laser beam across the target trees in predetermined spray zones;
   measuring a range and angle for a plurality of elevations for the target tree;
   measuring a distance traveled for the sensor; and
   processing the range, angle and distance calculations and initiating spray control signals.

19. A method for sensing an object as recited in claim 18, wherein the laser beam scanning comprises the steps of:
   providing a mirror;
   placing the transmitter and receiver side-by-side, the axis of the laser beam coinciding with the axis of travel for the sensor;
   placing the mirror in the path of the laser beam and positioning the mirror for communicating with the transmitter and receiver, the axis of the transmitter and receiver such that a emitted beam axis and transmitted beam axis parallel to the axis of travel for the mirror reflecting the beams at a forty five degree angle from the axis;
   providing a motor having a shaft;
   affixing the shaft to the mirror for continuously rotating the mirror about the axis of the beam, the rotating beam forming a vertical scanning plane, the scanning plane being perpendicular to the axis of travel; and
   affixing an encoder to the shaft for identifying a scanning angle with a range, the encoder providing a signal output representative of the angle for a given range.

20. A method for sensing an object as recited in claim 18, further comprising the steps of:
   providing a plurality of laser beam initiating pulses to the transmitter, the pulses uniformly spaced in time;
   measuring a time-of-flight for a given laser beam pulse leaving the transmitter and detected by the receiver after being reflected from the target tree, the time-of-flight indicating the range for a particular pulse; and
   repeating time-of-flight measurements at a plurality of angles.

21. A method for sensing an object, the method useful in controlling an application of selected spraying materials onto target trees generally arranged in regular equidistant rows forming a grove, from a sprayer having controllable spray heads for distribution of the selected material, the sprayer generally traveling along an axis parallel to and between the rows, the method comprising the steps of:
   emitting a pulsed laser beam from a transmitter through an aperture, the pulsed laser beam being initiated by a pulsed trigger signal input to the transmitter;
   receiving the laser beam reflected from a point on the target tree into an aperture of a receiver, the receiver providing an output representative of a time-of-flight for a selected pulsed beam, the time-of-flight representative of the point the point on the tree;
   scanning the pulsed beam vertically across the target tree, the scanning being identified by an angle representing the angle of the laser beam relative to a reference angle;
   determining a location of the sensor during a scanning cycle, the scanning cycle being defined as a complete revolution of the laser beam about the axis of the sprayer path in a vertical scanning plane at a location along the axis of sprayer travel;
   establishing a plurality of designated spray zones, the spray zones having a predetermined direction and spray head nozzle opening for the selected material to be released from a plurality of the spray heads located on the sprayer;
   providing a microprocessor; and
   processing range, angle, and distance information by the microprocessor for determining tree heights and a location of the spray head corresponding to the tree height for a scanning measurement for an appropriate travel location of the sprayer, the processing including a distance adjustment accounting for a separation between the sensor and the spray head, the processing initiating a control signal for activating an appropriate spray head corresponding to the appropriate spray zone for the range measurement.

22. A method for sensing an object as recited in claim 21, wherein the scanning step comprises the steps of:
   providing a mirror;
   placing the transmitter and receiver apertures side-by-side, the axis of the laser beam emitted from the transmitter coinciding with the axis of travel for the sprayer;
   placing the mirror in the path of the laser beam and positioning the mirror for communicating with the transmitter and receiver, the axis of the transmitter and receiver such that a emitted beam axis and transmitted beam axis are parallel to the axis of travel for the sprayer, the mirror reflecting the beams at a forty five degree angle to the axis;

affixing a shaft to the mirror for continuously rotating the mirror about the axis of the beam, the rotating beam forming a vertical scanning plane perpendicular to the axis of travel; and providing an encoder, the encoder being affixed to the shaft for identifying a scanning angle with a range, the encoder providing a signal output representative of the angle for a given range.

23. A method for sensing an object as recited in claim 21, wherein the processing step further comprises the steps of:

establishing target tree spray zones, the zones being defined by minimum and maximum target tree heights, the tree heights being obtained from the ranges and corresponding angles;

disabling the transmitter during a portion of a scanning cycle where the ranges have been predetermined to be inappropriate for the spray application;

obtaining range measurements for the scanning laser beam;

calculating tree height measurements using the range measurements and the angles associated with the range measurements;

storing the ranges and angles, each range and angle associated with an appropriate zone;

determining spray signals appropriate for the zones;

accounting for a separation between the sprayer heads and a sensor location; and initiating appropriate spray signals for the appropriate spray zones.

* * * * *